(12) United States Patent
Lundy et al.

(10) Patent No.: US 12,257,952 B2
(45) Date of Patent: Mar. 25, 2025

(54) REARVIEW ASSEMBLY

(71) Applicant: GENTEX CORPORATION, Zeeland, MI (US)

(72) Inventors: Eric S. Lundy, Holland, MI (US); Mark R. Roth, Grand Rapids, MI (US); Nigel T. Lock, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 524 days.

(21) Appl. No.: 17/812,209

(22) Filed: Jul. 13, 2022

(65) Prior Publication Data

US 2023/0017660 A1   Jan. 19, 2023

Related U.S. Application Data

(60) Provisional application No. 63/222,081, filed on Jul. 15, 2021.

(51) Int. Cl.
  *B60R 1/12* (2006.01)
  *G02F 1/1333* (2006.01)
  (Continued)

(52) U.S. Cl.
  CPC .......... *B60R 1/12* (2013.01); *G02F 1/133509* (2013.01); *G02F 1/153* (2013.01);
  (Continued)

(58) Field of Classification Search
  CPC ..... G02F 1/133509; G02F 1/153; B60R 1/12; B60R 2001/1253
  (Continued)

(56) References Cited

U.S. PATENT DOCUMENTS 10,730,436 B2   8/2020   Hamlin
2017/0120824 A1*   5/2017   Hallack ................. B60R 1/087
(Continued)

FOREIGN PATENT DOCUMENTS

| JP | 2004136760 A | 5/2004 |
| KR | 1020200072995 A | 6/2020 |
| WO | 2020012340 A1 | 1/2020 |

OTHER PUBLICATIONS

International Search Report dated Nov. 3, 2022, for corresponding PCT application No. PCT/US2022/073665, 3 pages.
(Continued)

*Primary Examiner* — Jerry L Brooks
(74) *Attorney, Agent, or Firm* — Price Heneveld LLP; Brian James Brewer (57) ABSTRACT

A rearview assembly is disclosed. The rearview assembly may comprise an electro-optic element, a display element, and/or a sensor. The electro-optic element may comprise first and second substrates, an electro-optic medium, and a spectral filter. The first and second substrates may be disposed in a substantially spaced apart relationship and may have first and second edges, respectively. The electro-optic medium is disposed between the first and second substrates. The spectral filter may be substantially opaque in appearance and disposed in a peripheral manner on the first substrate. Additionally, the first and second substrates have a substantial miss-match where a line bisecting the first substrate does not bisect the second substrate. The display element is operable to display a digital image. The sensor is operable to sense a condition and generate a signal based thereon. Additionally, the sensor may be optically aligned with the miss-match.

19 Claims, 4 Drawing Sheets

(51) Int. Cl.
*G02F 1/1335* (2006.01)
*G02F 1/153* (2006.01)

(52) U.S. Cl.
CPC .. *B60R 2001/1253* (2013.01); *G02F 1/13338* (2013.01); *G02F 2203/055* (2013.01)

(58) Field of Classification Search
USPC .......................................................... 359/604
See application file for complete search history.

(56) References Cited

U.S. PATENT DOCUMENTS

| | | |
|---|---|---|
| 2020/0023775 A1 | 1/2020 | Bergstrom et al. |
| 2021/0114524 A1 | 4/2021 | Niu et al. |
| 2021/0335859 A1 | 10/2021 | Olson et al. |

OTHER PUBLICATIONS

Written Opinion dated Nov. 3, 2022, for corresponding PCT application No. PCT/US2022/073665, 4 pages.

\* cited by examiner

REARVIEW ASSEMBLY

CROSS REFERENCE TO RELATED APPLICATIONS

This application claims priority under 35 U.S.C. § 119(e) to U.S. Provisional Application No. 63/222,081 filed on Jul. 15, 2021, entitled "REARVIEW ASSEMBLY," the disclosure of which is hereby incorporated by reference in its entirety.

FIELD OF INVENTION

The present invention relates in general to rearview assemblies and, more particularly, to rearview assemblies with enhanced functionalities.

SUMMARY

In accordance with the present disclosure, problems associated with rearview assemblies having both sensors and displays have been substantially reduced or eliminated.

According to one aspect, a rearview assembly is disclosed. The rearview assembly may comprise an electro-optic element, a display, and a sensor. The electro-optic element may comprise a first substrate, a second substrate, an electro-optic medium, and a spectral filter. The first substrate may have a first surface, a second surface, and a first edge. The second substrate may have a third surface, a fourth surface, and a second edge. Further, the second substrate may be disposed in a first direction in a substantially spaced apart relationship relative the first substrate such that the second and third surfaces face one another. The electro-optic medium may be disposed between the first and second substrates. The spectral filter may be disposed in a peripheral manner on the second surface. Further, the spectral filter may have a substantially opaque appearance to a user. Additionally, the first and second substrates may have at least one substantial miss-match such that at a miss-match, a line extending in the first direction bisects the first substrate but not the second substrate. The display element may be disposed in the first direction relative the electro-optic element. Further, the display element may be operable to display a digital image having a field rearward or to the side relative a vehicle. The sensor may be operable to sense a condition and generate a signal based thereon. Further, the sensor may be optically aligned with a first miss-match. Thus, the sensor may occupy a space that would otherwise be occupied by the second substrate if not for the first miss-match. In some embodiments, the sensor may be a camera operable to image an occupant of the vehicle. In some embodiments, the one miss-match may be located at a bottom corner of the rearview assembly. In some embodiments, the first substrate has a width and a height substantially greater than that of the display element. In some embodiments, the spectral filter may have a width that is substantially greater when in alignment with the miss-match. In some embodiments, the spectral filter may extend across a substantial entirety of the miss-match. In some embodiments, the first miss-match may be aligned with a bottom corner of the rearview assembly as viewed under normal operating conditions. In some embodiments, the spectral filter may comprise an aperture aligned with the camera. In some embodiments, the display element does not extend beyond the second substrate. In some embodiments, the rearview assembly may further comprise a touchscreen user interface substantially aligned with a second miss-match. In some embodiments, a controller may be operable to perform at least one of a biometric authentication, driver monitoring, and occupant monitoring operation based, at least in part, on the signal.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, specific devices and processes illustrated in the attached drawings and described in this disclosure are simply exemplary embodiments of the inventive concepts defined in the appended claims. Hence, specific characteristics relating the embodiments disclosed herein are not to be considered as limiting, unless the claims expressly state otherwise.

Figure 1:
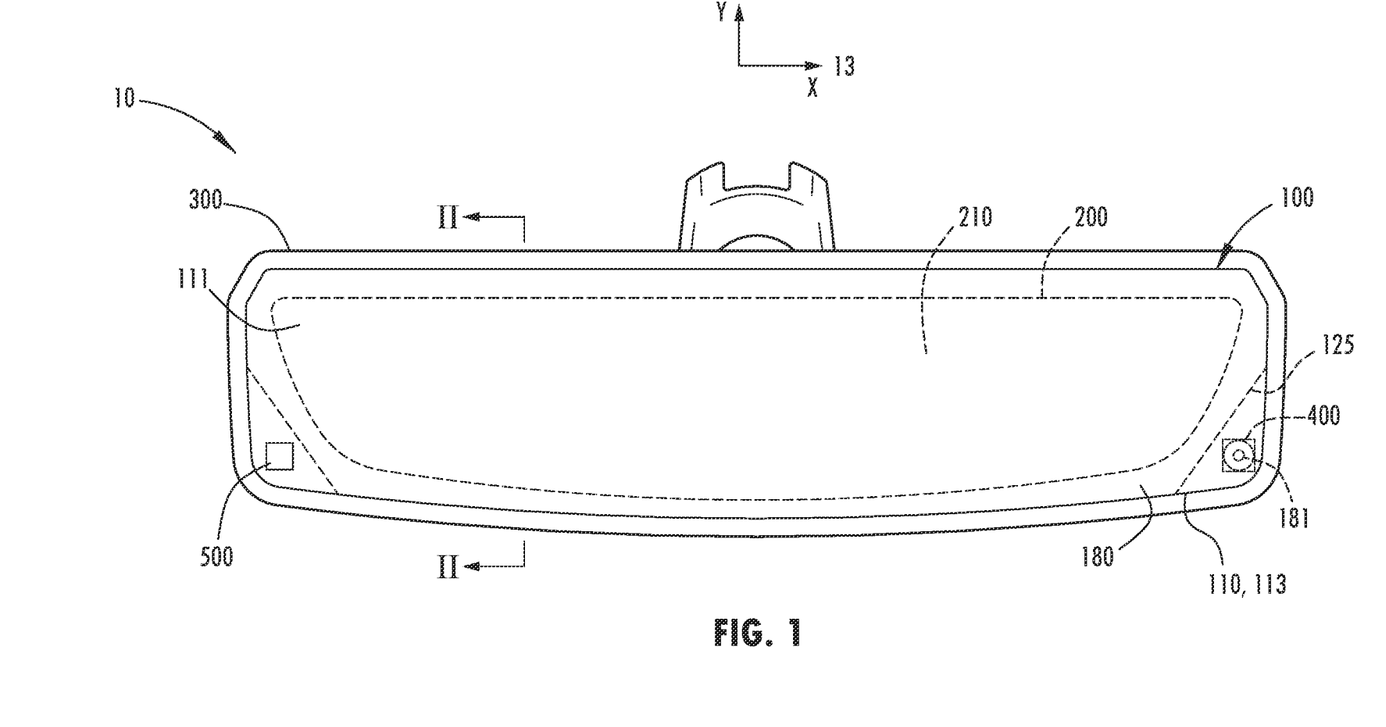
FIG. 1: a schematic representation of an embodiment of a rearview assembly.
Figure 2:
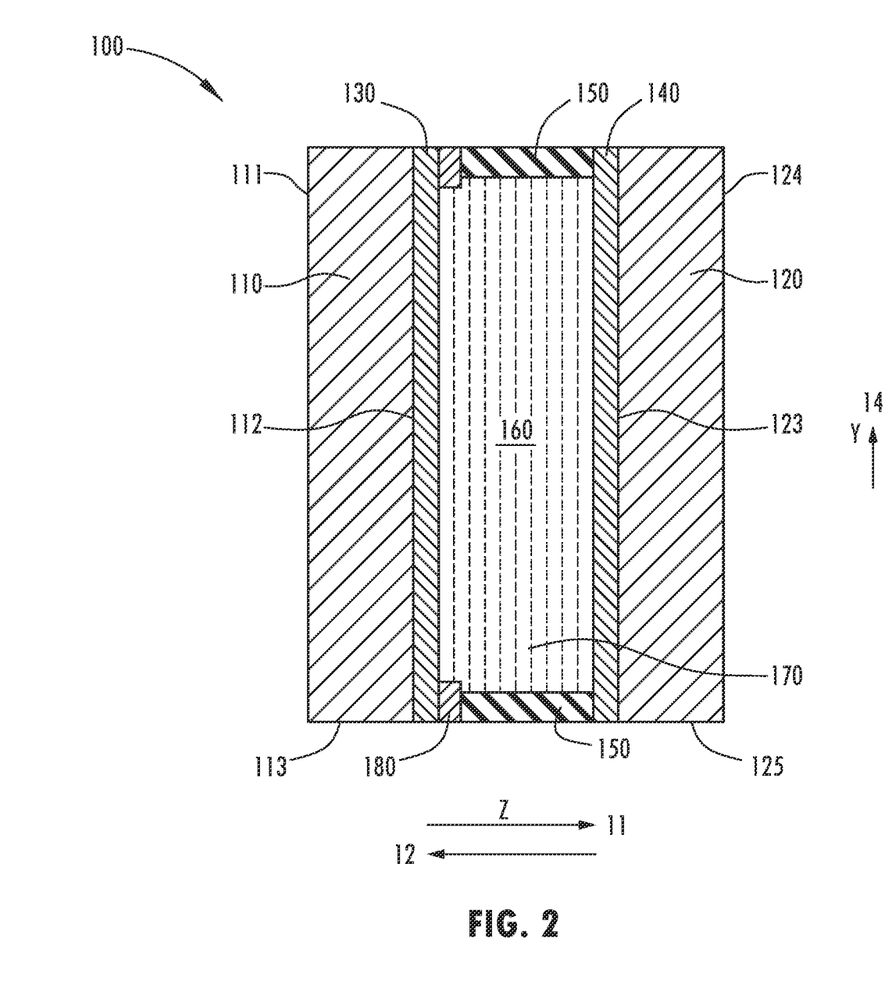
FIG. 2: a cross-sectional view of an embodiment of an electro-optic element.
Figure 3:
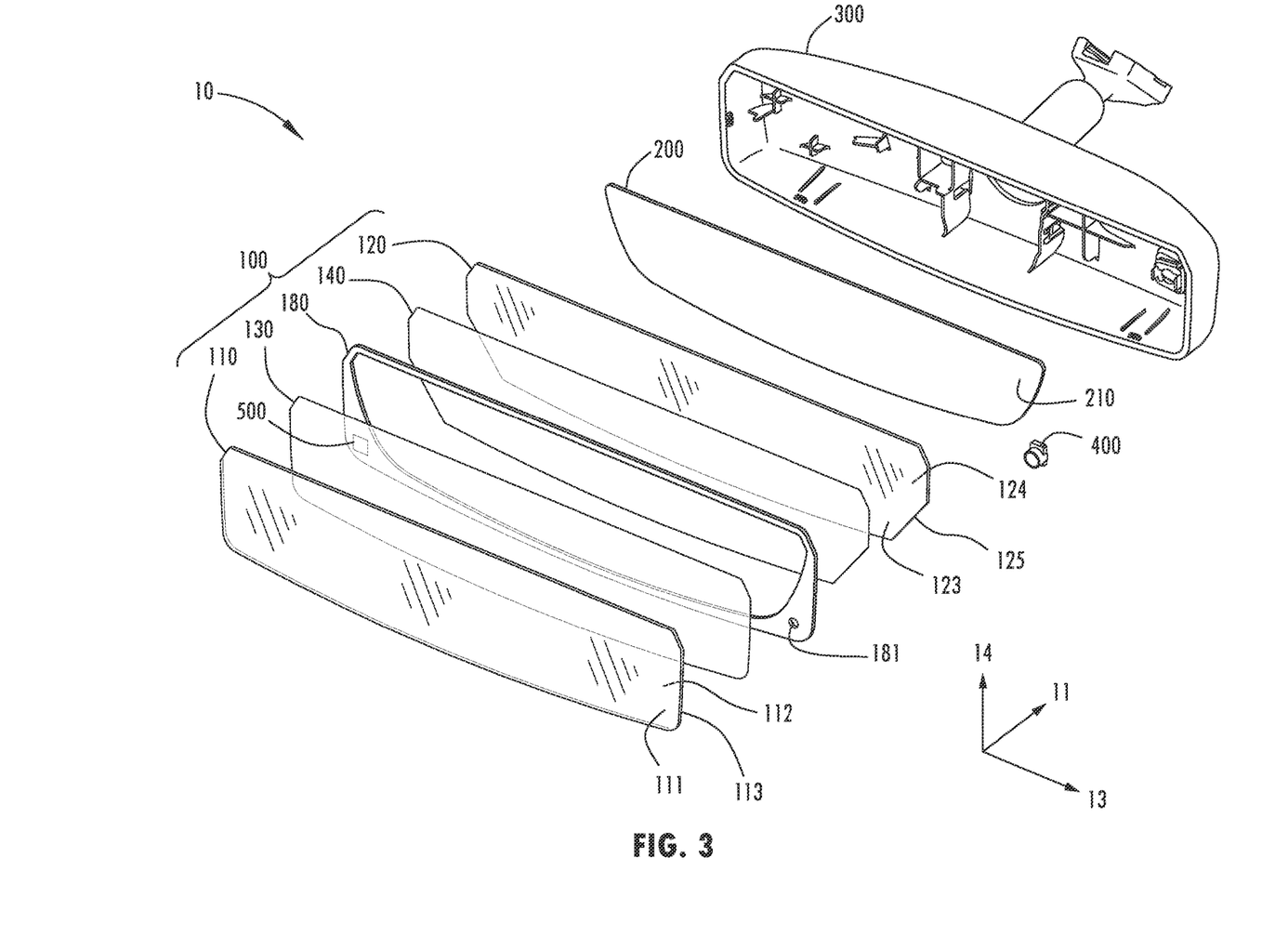
FIG. 3: an exploded perspective view of an embodiment of a rearview assembly.
Figure 4:
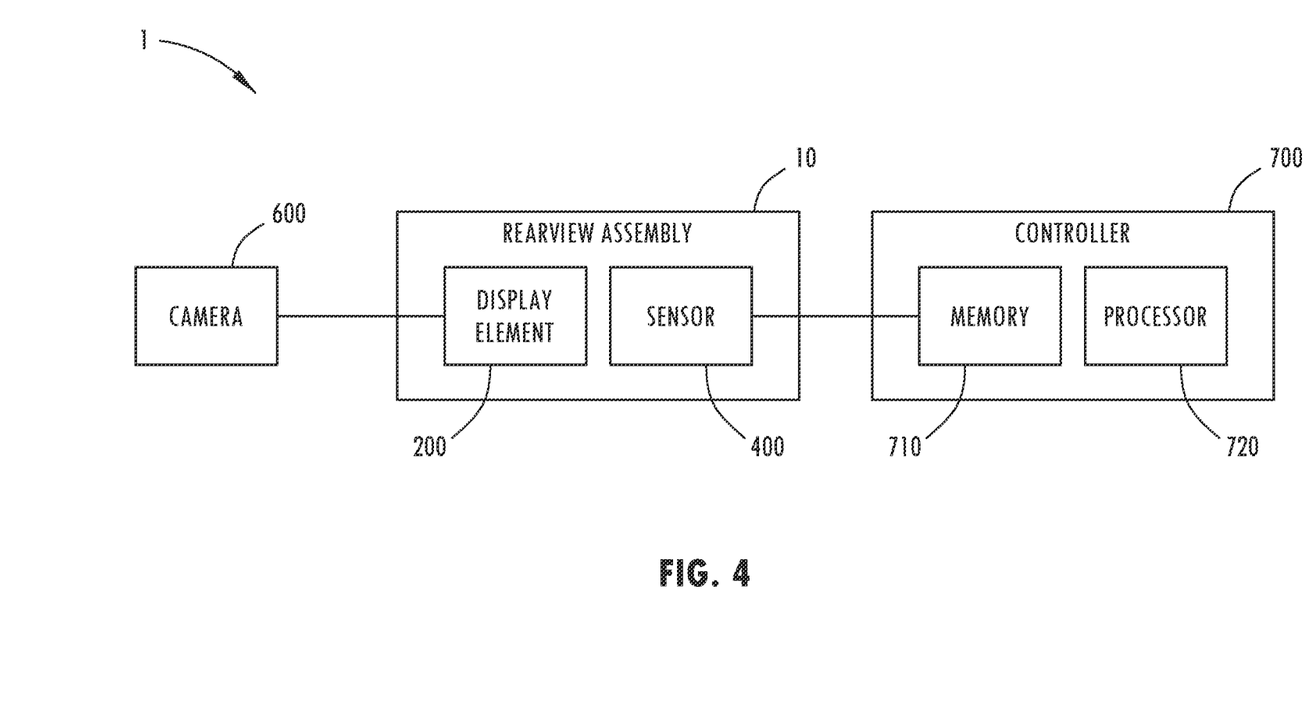
FIG. 4: a schematic representation of a rearview assembly incorporated into a system.

The present disclosure is directed to a rearview assembly with enhanced features and functionality. Accordingly, FIGS. 1-3 illustrate embodiments of various aspects of a rearview assembly 10. Rearview assembly 10 may comprise an electro-optic element 100, a display element 200, a housing 300, one or more sensor 400, and/or a user interface 500. Further, rearview assembly 10 may be disposed on and/or in a vehicle and be operable to provide a user with a view rearward and/or to the side relative the vehicle. The user may be an occupant of the vehicle, such as a driver. Thus, rearview assembly 10 may be an interior or an exterior rearview assembly 10. In some embodiments, rearview assembly 10 may further comprise and/or be a part of a system 1 comprising a camera 600 and/or a controller 700, as shown in FIG. 4. Embodiments of rearview assembly 10 may have an advantage of incorporating both a display element 200 and a sensor 400 while achieving a pleasing aesthetic.

Electro-optic element 100 may comprise a first substrate 110, a second substrate 120, a first electrode 130, a second electrode 140, a seal 150, a chamber 160, an electro-optic medium 170, and/or a spectral filter 180. Further, electro-optic element 100 may be configured to operate between a substantially activated state and a substantially un-activated state. Operation between such states may correspond to varying a degree of transmissivity or reflectance of electro-optic element 100.

First substrate 110 may be substantially transparent in the visible and/or infrared regions of the electromagnetic spectrum. Further, first substrate 110 may have a first surface 111, a second surface 112, and a first edge 113. First surface 111 and second surface 112 may be disposed opposite one another with second surface 112 disposed in a first direction 11 relative first surface 111. First direction 11 may be defined as a direction substantially orthogonal first surface 111. As such, first direction 11 may be parallel to and/or correspond to a Z-axis from a perspective of a user oriented toward first surface 111. Accordingly, first direction 11 may correspond to a depth. First edge 113 may be an edge defined by a perimeter of first substrate 110 circumscribing and extending between the first and second surfaces 111, 112. Additionally, first substrate 110, for example, may be fabricated from any of a number of materials, such as: alumino-silicate glass, such as Falcon commercially available from AGC; boroaluminosilicate (BAS) glass; polycarbonate, such as ProLens® polycarbonate, commercially available from Professional Plastics, which may be hard coated; polyethylene terephthalate, such as Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly(methyl methacrylate) (PMMA)), polymethacrylates, polyimides, polyamides (e.g., a cycloaliphatic diamine dodecanedioic acid polymer (e.g., Trogamid® CX7323)), epoxies, cyclic olefin polymers (COP) (e.g., Zeonor 1420R), cyclic olefin copolymers (COC) (e.g., Topas 6013-S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable—so long as the materials are at least substantially transparent and exhibit appropriate physical properties such as strength and tolerance to conditions of the electro-optic element's 100 environment, such as ultra-violet light exposure from the sun, humidity, and temperature extremes.

Similarly, second substrate 120 may have a third surface 123, a fourth surface 124, and a second edge 125. Third surface 123 and fourth surface 124 may be disposed opposite one another with fourth surface 124 disposed in the first direction 11 relative third surface 123. Second edge 125 may be an edge defined by a perimeter of second substrate 120 circumscribing and extending between the third and fourth surfaces 123, 124. Additionally, second substrate 120 may be disposed in the first direction 11 in a substantially parallel and spaced apart relationship relative first substate 110. Thus, third surface 123 may face second surface 112. As such, first substrate 110 may be disposed in a second direction 12 relative second substrate 120. Second direction 12 is a direction substantially opposite first direction 11. In some embodiments, second substrate 120 may be substantially transparent in the visible and/or infrared regions. Accordingly, second substrate 120 may be comprised of the same or similar materials suitable for first substate 110.

In some embodiments, second substrate 120 may have at least one substantial miss-match with first substrate 110. The miss-match may be formed by all or part of second edge 125 being substantially inboard relative first edge 113. As a result, a line extending in the first and/or second directions 11, 12 and bisecting first substrate 110, may not bisect second substrate 120. In some embodiments, this substantially inboard relationship may define a recess in second substrate 120. Thus, first substrate 110 may extend beyond second substrate 120 in third and/or fourth directions 13, 14 or their opposites at one or more portions of electro-optic element 100. The third and fourth directions 13, 14 each may be substantially orthogonal one another as well as substantially orthogonal to both the first and second directions 11, 12. As such, third direction 13 may be parallel to and/or correspond to an X-axis from the perspective of a user oriented toward first surface 111. Similarly, fourth direction 14 may be parallel to and/or correspond to a Y-axis from the perspective of a user oriented toward first surface 111. Thus, third direction 13 may correspond to a width and fourth direction 14 may correspond to a height. Accordingly, the first, second, third, and fourth surfaces 111, 112, 123, 124 may each lie in planes extending in the second and third directions 11, 12. In some embodiments, the substantially inboard relationship of second edge 125 relative first edge 113 may occur at one or both lower corners of rearview assembly 10 as viewed by a user under normal operating conditions, where the user is oriented toward first surface 111.

First electrode 130 may be associated with second surface 112 of first substrate 110. Accordingly, in some embodiments, first electrode 130 may be disposed on second surface 112 of first substrate 110. Additionally, first electrode 130 may be an electrically conductive material. In some embodiments, first electrode 130 may be in electrical communication with electro-optic medium 170. In some embodiments, first electrode 130 may be substantially transparent, reflective, and/or transflective in the visible, infra-red, and/or near infra-red regions of the electromagnetic spectrum. Thus, the electrically conductive material of first electrode 130, for example, may be a transparent conductive oxide (TCO) such as fluorine doped tin oxide (FTO), indium tin oxide (ITO), aluminum doped zinc oxide (AZO), or indium zinc oxide (IZO).

Second electrode 140 may be associated with third surface 123 of second substrate 120. Accordingly, in some embodiments, second electrode 140 may be disposed on third surface 123 of second substrate 120. Additionally, second electrode 140 may be an electrically conductive material. In some embodiments, second electrode 140 may be in electrical communication with electro-optic medium 170. Thus, the first and second electrodes 130, 140 may together be operable to apply an electrical potential and/or field to electro-optic medium 170. In some embodiments, second electrode 140 may be substantially transparent, reflective, and/or transflective in the visible, infra-red, and/or near infra-red regions of the electromagnetic spectrum. Thus, the electrically conductive material of second electrode 140, for example, may be a transparent conductive oxide (TCO) such as fluorine doped tin oxide (FTO), indium tin oxide (ITO), aluminum doped zinc oxide (AZO), or indium zinc oxide (IZO).

Seal 150 may be disposed in a peripheral manner to define chamber 160 in combination with one or more of first substrate 110, second substrate 120, first electrode 130, and second electrode 140. In some embodiments, seal 150 may be substantially disposed between the first and second substrates 110, 120. In some such embodiments, seal 150 may substantially follow second edge 125. In such an embodiment, at various parts thereof, seal 150 may be aligned substantially interior relative first substrate 110. Further, seal 150 may comprise any material capable of being adhesively bonded to one or more of first substrate 110, second substrate 120, first electrode 130, and second electrode 140 to in turn seal chamber 160, such that an electro-optic medium 170 may not inadvertently leak out of chamber 160.

Electro-optic medium 170 may be disposed in chamber 160. Thus, electro-optic medium 170 may be disposed between the first and second electrodes 130, 140. Further, electro-optic medium 170 may be operable between substantially activated and substantially un-activated states based, at least in part, on exposure to a particular electrical potential or field applied by the first and second electrodes 130, 140. Accordingly, electro-optic medium 170 may, for example, be an electrochromic medium, a polymer dispersed liquid crystal (PDLC) medium, twisted nematic liquid crystal medium, or suspended particle liquid crystal medium. In embodiments where electro-optic medium 170 is electrochromic, in an activated state, electro-optic medium 170 may be operable to exhibit a change, relative an un-activated state, in its extinction coefficient at one or more wavelengths in the electromagnetic spectrum. In some sycg embodiments, this change may occur in the visible region of the electromagnetic spectrum.

Spectral filter 180 is disposed between first substrate 110 and seal 170 and/or second substrate 120, in a peripheral manner. Thus, spectral filter 180 may be associated with second surface 112 and/or first electrode 130. Additionally, spectral filter 180 may be substantially opaque to a user disposed in the second direction 12 and looking in the first direction 11 to spectral filter 180. Further, spectral filter 180 may be reflective. Accordingly, spectral filter 180 may incorporate a hiding layer such as a chrome ring or other similar finish to conceal things generally disposed in the first direction 11 there behind when observed by user disposed in the second direction 12 relative rearview assembly 10 and looking in the first direction 11. In other embodiments, spectral filter 180 may be constructed of a single layer or stack of layers. In some embodiments, spectral filter 180 may be constructed of a material, such as chrome, back filled into laser ablation lines formed in first substrate 110. In some such embodiments, the laser ablation lines may have varied line width.

In some embodiments, spectral filter 180 may generally follow first edge 113 and have a width. The width corresponds to a magnitude of its extension interior first substrate 110 relative first edge 113. Additionally, at least part of spectral filter 180 may be substantially aligned with the miss-match between the first and second substrates 110, 120 where first substrate 110 extends beyond second substrate 120 in the third and/or fourth directions 13, 14. Further, the width of spectral filter 180 may be substantially greater when in alignment with the miss-match. In some such embodiments, spectral filter 180 may have a width and alignment such that spectral filter 180 covers a substantial entirety of the miss-match.

In some embodiments, spectral filter 180 may also comprise or define an aperture 181. Aperture 181 may be an absence of spectral filter 180 or may be a portion thereof that is transmissive to light traveling substantially in the first direction 11 in a first wavelength range. In some embodiments, the first wavelength range may be in the visible region of the electromagnetic spectrum. In other embodiments, the first wavelength range may be in the infra-red and/or near infra-red regions of the electromagnetic spectrum. In some embodiments, spectral filter 180 may have a substantially uniform appearance with respect to aperture 191 and the rest of spectral filter 180, so as to provide a pleasing aesthetic. It will be understood that spectral filter 180 may be constricted from any one of a number of materials and methods, including, for example, those disclosed in U.S. patent application Ser. No. 17/237,478, entitled "Discreet Opening," which is herein incorporated by reference.

Display element 200 may be any device configured and/or operable to display a digital image in a display area 210. The digital image may be captured by a rearview and/or sideview camera 600 of the vehicle. Thus, display element 200 may be operable to provide a user with a rearward and/or sideward view from the vehicle, such as those traditionally associated with interior and/or exterior rearview mirrors of vehicles. For example, display element 200 may be LCD, LED, OLED, micro-LED, plasma, DLP, or other technology. Further, display element 200 is disposed in the first direction 11 relative optical element 100. Additionally, display element 200 may be disposed in a spaced apart relationship with or associated with or in abutting contact with electro-optic element 100, such that the image displayed by display element 200 in display area 210, may be viewed through electro-optic element 100 by the user. Thus, display area 210 may be substantially aligned in the third and/or fourth directions 13, 14 with second substrate 120. Additionally, display element 200 may be associated with second substate 120. In some embodiments, the displayed image may be transmitted in the second direction 12 such that its transmission does not substantially extend in either of the third or fourth directions 13, 14, beyond second edge 125 of second substrate 120. Thus, the image transmission may not substantially extend into the miss-match between the first and second substrates 110, 120. Accordingly, display area 210 may have a width and/or a height less than that of first substrate 110.

Housing 300 may be a structure defining a cavity having an opening in the second direction 12 thereof. Display element 200 may be disposed within the cavity. Additionally, electro-optic element 100 may be disposed in substantial alignment with or substantially within the opening of the cavity. Further, housing 300 may make abutting contact with electro-optic element 100, partially encompass electro-optic element 100, or completely encompass electro-optic element 100. In some embodiments, rearview assembly 10 may be bezel-less. In some such embodiments, housing 300 may extend around a portion of electro-optic element 100 such that housing 300 does not extend onto first surface 111 of first substrate 110. In other such embodiments, housing 300 may extend around a portion of optical element 100 such that housing 300 does not extend onto first edge 113 of first substrate 110. Accordingly, in some embodiments, housing 300 may not extend in the second direction 12 beyond a plane extending from first surface 111. In other words, housing 300 may not break a plane extending from first surface 111. In other embodiments, housing 300 may not extend in the second direction 12 beyond a plane extending from second surface 112. In other words, housing 300 may not break a plane extending from second surface 112.

A sensor 400 may be any device operable to sense a condition and generate a signal based thereon. For example, sensor 400 may be an optical sensor such as a camera or a glare light sensor. Further, the optical sensor may be sensitive to light in the first wavelength range. The sensed condition may correspond to a condition within a cabin of the vehicle. Accordingly, in embodiments where sensor 400 is a camera, the camera may be operable to image in the visible, infra-red, and/or near infra-red regions of the electromagnetic spectrum. Therefore, sensor 400 may be operable to image the cabin of the vehicle and/or a driver and/or occupant disposed therein. In other examples, sensor 400 may be a sensor of a different sort, such as a radar, lidar, ultrasonic, and/or LED time—of flight sensor. Sensor 400 may be disposed in housing 300. Further, sensor 400 may be optically aligned with a miss-match between the first and second substrates 110, 120. Thus, sensor 400 may be disposed in the first direction 11 relative first substrate 110. Additionally, sensor 400 may be aligned with spectral filter 180 and/or aperture 181 thereof. In some embodiments, sensor 400 may be positioned proximate or in abutment with first substrate 110 and/or second surface 112. Specifically, sensor 400 may occupy a space that would otherwise be occupied by second substrate 120 if there was not a miss-match between the first and second substrates 110, 120. In some such embodiments, this space may be occupied by a lens of sensor 400. Additionally, in some embodiments, first substrate 110, second substrate 120, spectral filter 180, and/or housing 300 may be symmetrical. Accordingly, in some embodiments, electro-optic element 100 may possess at least two substrate miss-matches, which may be mirror image of one another. Thus, multiple sensors 400 may be included in rearview assembly 10, each associated with a respective substrate miss-match.

User interface 500 may be a button. The button, for example, may be capacitive touch, tactile, carbon pilz or other similar technology. Accordingly, user interface 500 may be a touch screen surface. Further, user interface 500 may be disposed in a region substantially symmetrically located relative the substrate miss-match location where sensor 400 is disposed. For example, in an embodiment where sensor 400 is disposed in alignment with a substrate miss-match in a first lower corner, such as a lower right corner, of rearview assembly 10, user interface 500 may be disposed in a second lower corner, such as a lower left corner, of rearview assembly 10. Additionally, user interface 500 may be associated with first surface 111 of first substrate 110. Furthermore, user interface 500 may be in alignment with spectral filter 180. In such an embodiment, spectral filter 180 may form or comprise one or more indicia indicative of a function of user interface 500. In some such embodiments, a light source may be disposed in the first direction 11 relative spectral filter 180 and be operable to illuminate the indicia. In some embodiments, actuation of the user interface 500 may be operable to cause sensor 400 to capture an image.

Camera 600 may be configured and/or operable to capture light and generate one or more corresponding images, such as digital images. Further, camera 600 may be a Semi-Conductor Charge-Coupled Device (CCD) or a pixel sensor of Complementary Metal-Oxide-Semi-Conductor (CMOS) technologies. In some embodiments, the one or more images may be captured in series as a video stream. In some embodiments, the images captured by camera 600 may have a field of view corresponding to a scene exterior the vehicle. Accordingly, the field of view may substantially correspond to a field of view traditionally associated with an interior rearview assembly, driver side exterior rearview assembly, passenger side exterior rearview assembly, or back-up camera. Thus, the scene may be rearward and/or to the side relative the vehicle. Additionally, camera 600 may be communicatively connected to display element 200 As used herein, "communicatively connected" may mean connected directly or indirectly though one or more electrical components. Accordingly, camera 600 may be operable to communicate one or more of the one or more captured images to display element 200.

Controller 700 may comprise a memory 710 and a processor 720. Memory 710 may be a non-transitory computer-readable media (CRM). Additionally, memory 710 may be configured and/or operable to store one or more instructions, such as one or more algorithms, to provide for the configuration and operation of controller 700. Examples of memory 141 include conventional hard disks, solid-state memories, random access memories (RAM), read-only memory (ROM), erasable programmable read-only memory (EPROM), electronically erasable programmable read-only memory (EEPROM), optical or magnetic disks, dynamic random-access memory (DRAM). Further, controller 700 may be communicatively connected to sensor 400. Accordingly, controller 700 may be operable to receive collected data from sensor 400. The instructions and/or algorithms may be operable to analyze the received data from sensor 400. Further, the data may be analyzed in accordance with the performance of one or more of a biometric authentication, driver monitoring, or occupant monitoring operation. Processor 720 may be communicatively connected to memory 710. Further, processor 720 may be any device or electronic circuit configured and/or operable to process or execute one or more sets of electronic instructions, such as the algorithm. These instructions may be stored in memory 710. Examples of processor 720 may include a central processing unit (CPU), a microprocessor, and/or an application specific integrated circuit (ASIC).

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first," "second," and the like, are used solely to distinguish one entity or action from another entity or action, without necessarily requiring or implying any actual such relationship or order between such entities or actions.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The term "substantially," and variations thereof, will be understood by persons of ordinary skill in the art as describing a feature that is equal to or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A rearview assembly comprising:
   an electro-optic element comprising:
      a first substrate having a first surface, a second surface, and a first edge;
      a second substrate having a third surface, a fourth surface, and a second edge, the second substrate disposed in a first direction in a substantially spaced apart relationship relative the first substrate such that the second and third surfaces face one another;
      an electro-optic medium disposed between the first and second substrates; and
      a spectral filter disposed in a peripheral manner on the second surface, the spectral filter having a substantially opaque appearance to a user;
      wherein the first and second substrates have at least one substantial miss-match such that at a miss-match a line extending in the first direction bisects the first substrate but not the second substrate;
   a display element disposed in the first direction relative the electro-optic element, the display element operable to display a digital image having a field rearward or to the side relative a vehicle; and
   a sensor operable to sense a condition and generate a signal based thereon, the sensor optically aligned with a first miss-match.

2. The rearview assembly of claim 1, wherein the sensor is a camera operable to image an occupant of the vehicle.

3. The rearview assembly of claim 1, wherein the sensor occupies a space that would otherwise be occupied by the second substrate if not for the first miss-match.

4. The rearview assembly of claim 1, wherein one miss-match is located at a bottom corner of the rearview assembly.

5. The rearview assembly of claim 1, wherein the first substrate has a width and a height substantially greater than that of the display element.

6. The rearview assembly of claim 1, wherein the spectral filter has a width that is substantially greater when in alignment with the miss-match.

7. The rearview assembly of claim 1, wherein the spectral filter extends across a substantial entirety of the miss-match.

8. The rearview assembly of claim 1, wherein the first miss-match is aligned with a bottom corner of the rearview assembly as viewed under normal operating conditions.

9. The rearview assembly of claim 1, wherein the spectral filter comprises an aperture aligned with the camera.

10. The rearview assembly of claim 1, wherein the display element does not extend beyond the second substrate.

11. The rearview assembly of claim 1, further comprising a touchscreen user interface substantially aligned with a second miss-match.

12. The rearview assembly of claim 1, wherein a controller is operable to perform at least one of a biometric authentication, driver monitoring, and occupant monitoring operation based, at least in part, on the signal.

13. The rearview assembly of claim 1, wherein the miss-match is caused by at least part of the second edge being substantially inboard relative the first edge.

14. The rearview assembly of claim 1, wherein the miss-match is defined, at least in part, by a recess in the second substrate.

15. The rearview assembly of claim 1, wherein the electro-optic medium is electrochromic.

16. The rearview assembly of claim 1, wherein:
    the display has a display area defined by the digital image; and
    the display area is substantially aligned with the second substrate.

17. The rearview assembly of claim 1, wherein:
    The display has a display area defined by the digital image; and
    The display area has a width and a height less than that of the first substrate.

18. The rearview assembly of claim 1, wherein the first and second substates have two substantial miss-matches.

19. The rearview assembly of claim 18, wherein the two substantial miss-matches mirror one another.

* * * * *